Aug. 18, 1942. H. J. MURPHY 2,293,614
FASTENER MEMBER AND FASTENER INSTALLATION
Filed March 11, 1939
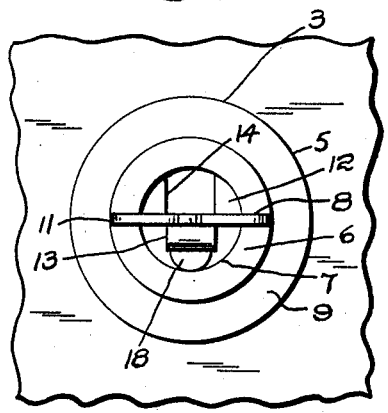
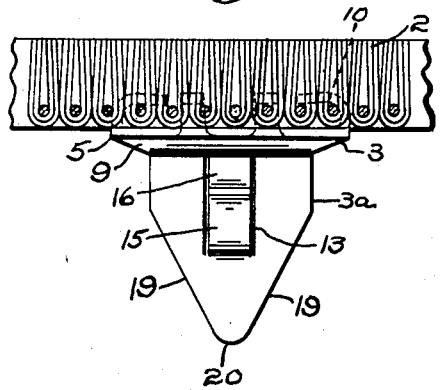
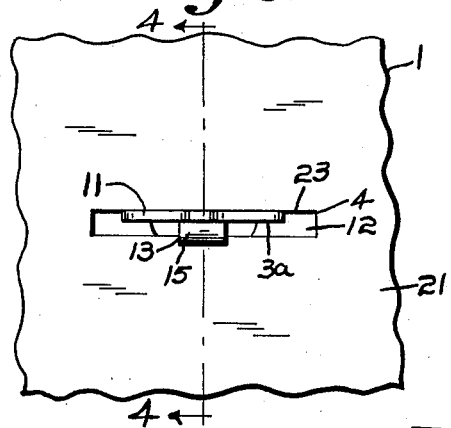
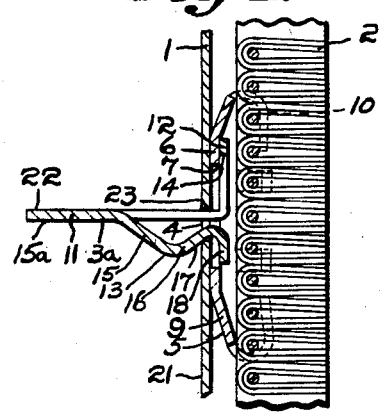
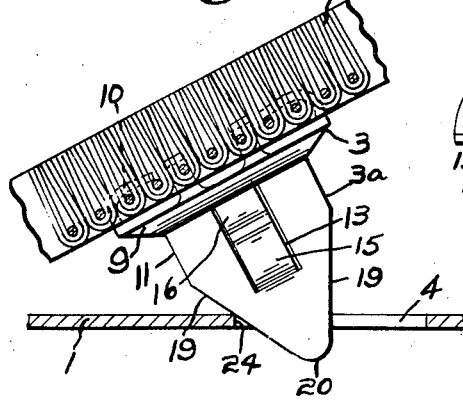
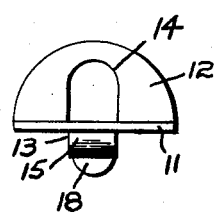
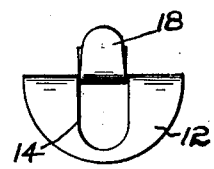
Inventor:
Howard J. Murphy.
by John Todd
Atty.

Patented Aug. 18, 1942

2,293,614

UNITED STATES PATENT OFFICE 2,293,614

FASTENER MEMBER AND FASTENER INSTALLATION

Howard J. Murphy, Greenwood, Mass., assignor to United-Carr Fastener Corporation, Cambridge, Mass., a corporation of Massachusetts Application March 11, 1939, Serial No. 261,383

3 Claims. (Cl. 24—73)

This invention relates to improvements in snap fastener members, particularly, though not exclusively, useful in securing a carpet and the like to a supporting panel.

Referring to the drawing, in which I have illustrated a preferred form of my invention:

Fig. 1 is an underneath plan of a portion of a carpet having one of my improved fastener members secured thereto;

Fig. 2 is an edge view of the installation shown in Fig 1;

Fig. 3 is an underneath plan of a portion of a supporting panel showing the manner in which a carpet is secured thereto through means of my improved snap fastener member;

Fig. 4 is a sectional view taken along the line 4—4 of Fig. 3;

Fig. 5 is a sectional elevation showing one method of moving my improved fastener member into fastener engagement with a supporting panel;

Fig. 6 is a bottom plan view of my improved fastener member per se; and

Fig. 7 is a top plan view of the fastener member shown in Fig. 6.

My preferred installation, as illustrated in Figs. 3, 4 and 5, includes a supporting panel 1 which may be the metal floor of an automobile, and a part to be secured to the supporting panel, such as a carpet 2, disposed in detachably fixed, superposed relation to the panel by means of the fastener unit 3. Although I have illustrated the carpet 2 as carrying only one of the fastener units 3, it is understood that it may carry as many as may be necessary for properly securing it to the support. The support 1 has a narrow rectangular opening 4 for receiving a stud 3ª of the fastener unit 3. The opening 4 is preferably longer than the width of the stud part of the fastener unit for a purpose to be described.

The fastener unit includes a casing part 5 and a fastener member secured in assembled relation with each other, as illustrated in Figs. 1, 2 and 4. The casing has a flat face 6 preferably presenting a circular aperture 7 having opposed narrow slots 8 on opposite sides of the aperture 7 through which the stud part 3ª of the fastener member extends, as shown in Fig. 1. Although I have preferred to illustrate the slots 8, in my preferred form, of minimum width to receive the stud part, it is understood that they may be of substantially greater width than the stud part to permit shiftability of the fastener member within the casing, as will be understood by those skilled in the art. The casing 5 has an annular wall 9 and a plurality of attaching prongs 10 extending upwardly from the wall for extension through the threads of the carpet and bent outwardly or inwardly to grip the web of the carpet between the annular wall 9 and the prongs so as to secure the casing thereto.

My preferred form of fastener member includes a body portion or flat plate portion 11 having a base portion or attaching portion 12 integrally joined to the plate portion at one end and extending from the plate portion in angular relation. The attaching portion 12, in my preferred form of fastener member, is disposed entirely on one side of the plate portion 11, as most clearly illustrated in Figs. 4 and 6. As a means for effecting snap fastener engagement of the fastener member with the support 1, I have provided a single spring arm 13 integrally joined to the plate portion 11 and, in my preferred form, formed entirely of material taken from within the marginal edges of the plate portion 11 and attaching portion 12 so as to leave an opening 14 in the last-mentioned portions. The arm 13 has a portion 15 extending outwardly from the plane of the face 15ª of the plate portion 11 (Fig. 4) and upwardly in the general direction of the attaching portion 12 and a portion 16 extending inwardly toward the plate portion 11 so as to form a shoulder 17 (Fig. 4). An outwardly-extending lip portion 18 preferably forms a continuation of the inwardly-extending portion 16 so as to prevent the chance of the free end of the inwardly-extending portion 16 becoming lodged behind the support 1 when the fastener member is in fastened engagement with the support, as will be understood by those skilled in the art. It is important to notice that the combined width of the stud part 3ª, before engagement with the support 1 on a line through the plate portion 11, and shoulder 17 is greater than the width of the opening 4 of the support with the result that the stud part may enter into snap fastener engagement with the support through the opening 4.

In order that the fastener member may be more easily entered into the opening 4 when the plate portion 11 and opening 4 are out of exact alignment, the plate portion 11 has opposite narrow edges 19—19 tapering toward the end of the plate portion away from that to which the attaching portion 12 is joined so as to form a leading nose 20 (Figs. 2 and 5).

When the parts of the fastener unit are assembled, the attaching portion 12 is disposed between the flat face 6 of the casing and the carpet, and the plate portion 11 of the fastener extends through the openings 7 and 8, as illustrated in Fig. 1.

The casing 3 may be secured to the carpet 2 in any suitable manner, but I prefer to secure it to the under side thereof by forcing the attaching prongs 10 into the carpet and bending them inwardly to maintain the carpet between the prongs and the annular wall 9.

When securing the carpet 2 to the support 1, the plate portion of the fastener member is aligned with the aperture 4, then by exerting pressure upon the carpet directly over the fastener member, the arm 13 is contracted until the shoulder 17 has passed through the opening, at which time the arm 13 expands to engage the shoulder behind the lower face 21 of the support. Contemporaneously with this action the face 22 of the plate 11 is forced adjacent the wall 23 of the aperture 4, as most clearly shown in Figs. 3 and 4. Separation of the fastener may be easily and quickly effected by lifting the carpet adjacent to the fastener unit.

When the plate portion 11 is not in exact alignment with the opening 4 during attachment, the tapered edges 19 may engage with an end wall 24 of the opening so as to cam the fastener into the opening, as illustrated in Fig. 5, to engage the spring arm 13 behind the support.

Although I have illustrated and described a preferred form of my invention, I do not wish to be limited thereby because the scope of my invention is best defined in the following claims.

I claim:

1. A fastener member for securing a part to an apertured support, said fastener comprising a base adapted to be disposed on one side of said support, a rigid plate portion of single thickness extending in angular relation from said base adapted to be projected through said aperture of said support, a single yieldable arm portion integrally joined to said plate portion extending outwardly from said plate toward said base and then inwardly toward said plate forming a shoulder for fastener engagement with an opposite side of said support from that on which said base is disposed, and the narrow edges at the lateral sides of said plate diverging from said end away from said base toward said base whereby said last-mentioned end has a generally tapered form for effecting easier entrance of said plate into said aperture when said plate is out of perfect alignment with said aperture.

2. A fastener installation comprising, in combination, a supporting member having an elongated opening therein, a part to be secured in superposed relation to said support, and a fastener member comprising a base portion at one end attached to said part to be secured to said support, a plate portion extending from said base portion through said opening of said support, said plate portion having its greatest width less than the length of said opening whereby said plate portion may align with said opening in varying positions in the direction of its horizontal plane, and a yieldable shouldered arm integral with said plate portion and disposed laterally of a face of said plate portion, said arm being movable through said opening contemporaneously with movement of said plate portion therethrough and said arm being yieldable relative to said plate in a line parallel to the minor axis of said opening thereby to dispose said shoulder in spring engagement with said support for securing the parts of said installation together.

3. A fastener installation comprising, in combination, a supporting member having an elongated opening therein, a part to be secured in superposed relation to said support and a fastener member comprising a base portion at one end attached to said part to be secured to said support, a plate portion extending from said base portion through said opening of said support with the plane of its broad faces substantially parallel to the longitudinal axis of said opening, a yieldable arm integral with said plate portion disposed opposite a face of said plate portion, said arm having a shoulder portion in spring engagement with said support through said opening for securing the parts of said installation together, and said plate portion having portions of its lateral edges tapering toward its end opposed to said base forming camming portions and one of said camming portions being engageable with material at an end of said opening in one relative position of said fastener to assist movement of said plate through said opening.

HOWARD J. MURPHY.